(12) United States Patent
Kim

(10) Patent No.: US 11,412,906 B2
(45) Date of Patent: Aug. 16, 2022

(54) CLEANING ROBOT TRAVELING USING REGION-BASED HUMAN ACTIVITY DATA AND METHOD OF DRIVING CLEANING ROBOT

(71) Applicant: LG ELECTRONICS INC., Seoul (KR)

(72) Inventor: Tae Hyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 319 days.

(21) Appl. No.: 16/551,224

(22) Filed: Aug. 26, 2019

(65) Prior Publication Data
US 2020/0054185 A1    Feb. 20, 2020

(30) Foreign Application Priority Data

Jul. 5, 2019    (KR) .................. 10-2019-0081468

(51) Int. Cl.
*A47L 11/40* (2006.01)
*A47L 9/28* (2006.01)
(Continued)

(52) U.S. Cl.
CPC .......... *A47L 11/4011* (2013.01); *A47L 9/009* (2013.01); *A47L 9/2852* (2013.01);
(Continued)

(58) Field of Classification Search
CPC .... A47L 11/4011; A47L 9/2852; A47L 9/009; A47L 11/4061; A47L 2201/04; A47L 9/2826; A47L 9/2857; A47L 9/30; A47L 9/28; G05D 1/0088; G05D 1/0285; G05D 1/0231; G05D 1/0212; G05D 2201/0215; G05D 2201/0203; G05D 1/0217;
(Continued)

(56) References Cited

U.S. PATENT DOCUMENTS 5,537,017 A  * 7/1996 Feiten .................. G01S 15/89
                                              318/587
5,732,401 A  * 3/1998 Conway ................ G06Q 30/04
                                              705/28
(Continued)

FOREIGN PATENT DOCUMENTS

KR         100962593      6/2010
KR        1020180039437   4/2018

*Primary Examiner* — Bhavesh V Amin
(74) *Attorney, Agent, or Firm* — Lee Hong Degerman Kang & Waimey

(57) ABSTRACT

The present disclosure provides a cleaning robot that communicates with peripheral devices over a 5G communication network and that preferentially cleans a region that needs to be cleaned the most based on the communication. Based on information about the use of a user terminal used in a movement space in which the cleaning robot moves or a collecting terminal collecting information about the behavior or locations of a user moving in the movement space, the cleaning robot preferentially moves to a region in which the user terminal or the collecting terminal is rarely used. That is, a region in which a user rarely travels, i.e. a region in which a large amount of dust or foreign substances is liable to accumulate, is cleaned preferentially by the cleaning robot, whereby the cleaning efficiency of the cleaning robot is improved.

11 Claims, 9 Drawing Sheets

(51) Int. Cl.
*A47L 9/00* (2006.01)
*G05D 1/00* (2006.01)
*G05D 1/02* (2020.01)

(52) U.S. Cl.
CPC ........ *A47L 11/4061* (2013.01); *G05D 1/0088* (2013.01); *G05D 1/0212* (2013.01); *G05D 1/0231* (2013.01); *G05D 1/0285* (2013.01); *A47L 2201/04* (2013.01); *G05D 2201/0203* (2013.01); *G05D 2201/0215* (2013.01)

(58) Field of Classification Search
CPC ... G05D 1/0219; B25J 11/0085; B25J 9/0003; B25J 9/1664; B25J 13/00; B25J 19/023
See application file for complete search history.

(56) References Cited

U.S. PATENT DOCUMENTS

| | | | | |
|---|---|---|---|---|
| 6,285,778 B1* | 9/2001 | Nakajima | | G05D 1/0248 382/104 |
| 6,362,875 B1* | 3/2002 | Burkley | | G05D 1/0246 382/103 |
| 6,504,610 B1* | 1/2003 | Bauer | | G01S 5/16 356/399 |
| 6,507,773 B2* | 1/2003 | Parker | | G06N 3/008 700/264 |
| 6,760,647 B2* | 7/2004 | Nourbakhsh | | G05D 1/0214 701/410 |
| 6,960,986 B2* | 11/2005 | Asama | | A61B 5/0002 340/10.41 |
| 7,211,980 B1* | 5/2007 | Bruemmer | | G05D 1/0274 318/587 |
| 7,557,703 B2* | 7/2009 | Yamada | | G01S 15/46 340/8.1 |
| 7,860,680 B2* | 12/2010 | Arms | | H02J 7/025 702/127 |
| 8,382,906 B2* | 2/2013 | Konandreas | | A47L 11/4019 15/50.2 |
| 8,438,695 B2* | 5/2013 | Gilbert, Jr. | | G05D 1/0242 15/319 |
| 9,402,518 B2* | 8/2016 | Burlutskiy | | A47L 9/2826 |
| 9,486,924 B2* | 11/2016 | Dubrovsky | | G05B 19/409 |
| 11,036,230 B1* | 6/2021 | Ebrahimi Afrouzi | | G05D 1/0221 |
| 2001/0037163 A1* | 11/2001 | Allard | | G05D 1/0282 700/245 |
| 2002/0027652 A1* | 3/2002 | Paromtchik | | G05D 1/0236 356/141.1 |
| 2003/0028286 A1* | 2/2003 | Glenn | | G05D 1/0282 700/259 |
| 2003/0216834 A1* | 11/2003 | Allard | | B25J 9/1689 700/245 |
| 2003/0229474 A1* | 12/2003 | Suzuki | | G08B 25/009 702/188 |
| 2004/0153212 A1* | 8/2004 | Profio | | G06N 3/008 700/258 |
| 2005/0000543 A1* | 1/2005 | Taylor | | G05D 1/0274 134/18 |
| 2005/0166354 A1* | 8/2005 | Uehigashi | | G05D 1/0274 15/319 |
| 2005/0166355 A1* | 8/2005 | Tani | | A47L 9/281 15/319 |
| 2005/0171636 A1* | 8/2005 | Tani | | G05D 1/0276 701/23 |
| 2005/0171637 A1* | 8/2005 | Tani | | G05D 1/0259 701/23 |
| 2005/0171644 A1* | 8/2005 | Tani | | A47L 9/2826 701/25 |
| 2005/0234611 A1* | 10/2005 | Uehigashi | | G05D 1/0259 701/23 |
| 2005/0237188 A1* | 10/2005 | Tani | | G05D 1/0274 340/541 |
| 2005/0237189 A1* | 10/2005 | Tani | | G08B 13/19697 340/541 |
| 2005/0288079 A1* | 12/2005 | Tani | | G05D 1/0246 463/1 |
| 2006/0034537 A1* | 2/2006 | Masaki | | G06V 40/10 382/254 |
| 2006/0069465 A1* | 3/2006 | Saeki | | A47L 7/0085 700/258 |
| 2006/0088204 A1* | 4/2006 | Shimizu | | G08B 13/19608 382/153 |
| 2006/0150361 A1* | 7/2006 | Aldred | | B60L 9/00 15/340.1 |
| 2006/0196003 A1* | 9/2006 | Song | | G05D 1/0259 15/319 |
| 2007/0021867 A1* | 1/2007 | Woo | | H04L 67/125 700/245 |
| 2007/0061041 A1* | 3/2007 | Zweig | | G05D 1/0261 700/245 |
| 2009/0055020 A1* | 2/2009 | Jeong | | G05D 1/0272 901/50 |
| 2010/0161225 A1* | 6/2010 | Hyung | | G05D 1/0274 345/420 |
| 2010/0168916 A1* | 7/2010 | Lin | | B25J 13/084 700/258 |
| 2011/0077802 A1* | 3/2011 | Halloran | | A47L 9/2894 701/2 |
| 2011/0122221 A1* | 5/2011 | Su | | H04L 67/125 348/E7.078 |
| 2011/0167574 A1* | 7/2011 | Stout | | G05D 1/0257 701/25 |
| 2013/0206177 A1* | 8/2013 | Burlutskiy | | G05D 1/0219 15/319 |
| 2014/0122702 A1* | 5/2014 | Jung | | H04L 67/22 709/224 |
| 2014/0123309 A1* | 5/2014 | Jung | | G06F 21/6254 726/27 |
| 2015/0120304 A1* | 4/2015 | Yamashita | | G10L 15/22 704/270.1 |
| 2015/0273697 A1* | 10/2015 | Abdullah | | B25J 11/009 901/1 |
| 2015/0284010 A1* | 10/2015 | Beardsley | | G05D 1/0289 701/1 |
| 2015/0289743 A1* | 10/2015 | Taoka | | A47L 9/2826 701/2 |
| 2016/0023357 A1* | 1/2016 | Dubrovsky | | G05D 1/0016 700/264 |
| 2016/0167228 A1* | 6/2016 | Wellman | | B25J 9/1602 901/3 |
| 2016/0193733 A1* | 7/2016 | Abdullah | | A61B 5/4833 901/1 |
| 2017/0008162 A1* | 1/2017 | Tsubota | | H04L 12/282 |
| 2018/0035606 A1* | 2/2018 | Burdoucci | | H04N 5/232935 |
| 2018/0200888 A1* | 7/2018 | Kim | | G05D 1/0246 |
| 2018/0361577 A1* | 12/2018 | Williams | | E01H 1/103 |
| 2018/0361581 A1* | 12/2018 | Williams | | B25J 9/1664 |
| 2018/0361583 A1* | 12/2018 | Williams | | A47L 11/4011 |
| 2018/0361584 A1* | 12/2018 | Williams | | G06V 20/58 |
| 2018/0361585 A1* | 12/2018 | Williams | | G05D 1/0282 |
| 2018/0364045 A1* | 12/2018 | Williams | | G01S 17/88 |
| 2019/0015985 A1* | 1/2019 | Kim | | B25J 9/1666 |
| 2019/0030716 A1* | 1/2019 | Chevallereau | | B25J 9/1676 |
| 2019/0197325 A1* | 6/2019 | Reiley | | G08B 13/19602 |
| 2019/0220020 A1* | 7/2019 | Macias | | G05D 1/0202 |
| 2019/0298134 A1* | 10/2019 | Takaoka | | A47L 9/2842 |
| 2019/0298139 A1* | 10/2019 | Takaoka | | G05D 1/0246 |
| 2019/0332119 A1* | 10/2019 | Kim | | G06V 20/10 |
| 2019/0343355 A1* | 11/2019 | Han | | A47L 9/2842 |
| 2020/0047337 A1* | 2/2020 | Williams | | B25J 9/163 |
| 2020/0047343 A1* | 2/2020 | Bal | | G05D 1/0219 |
| 2020/0054185 A1* | 2/2020 | Kim | | G05D 1/0217 |
| 2020/0387164 A1* | 12/2020 | Chae | | G05D 1/0225 |

* cited by examiner

CLEANING ROBOT TRAVELING USING REGION-BASED HUMAN ACTIVITY DATA AND METHOD OF DRIVING CLEANING ROBOT

CROSS-REFERENCE TO RELATED APPLICATION

Pursuant to 35 U.S.C. § 119(a), this application claims the benefit of earlier filing date and right of priority to Korean Patent Application No. 10-2019-0081468, filed on Jul. 5, 2019, the contents of which are hereby incorporated by reference herein in its entirety.

BACKGROUND

1. Technical Field

The present disclosure relates to a cleaning robot configured to travel so as to preferentially clean a region in which people rarely travel using human activity data. More particularly, the present disclosure relates to technology capable of determining data on human activity in a movement space using a user terminal used in the movement space or an image-information-collecting device collecting image information in the movement space and capable of driving a cleaning robot so as to preferentially clean a region in which people rarely travel.

2. Description of Related Art

The content described in this section merely provides background information related to embodiments of the present disclosure, and does not constitute the related art.

Robots have been developed for industrial uses, and have come to be used to manage some parts of factory automation. In recent years, robots have been applied to various fields, and, for example, medical robots, aerospace robots, etc. have been developed. In addition, home robots for use in ordinary homes have been developed. Among these robots, a robot capable of traveling by itself is called a mobile robot.

A representative example of a mobile robot for use in a home is a cleaning robot. A cleaning robot is an apparatus that cleans a predetermined region by suctioning dust or foreign substances around the cleaning robot while autonomously traveling in the corresponding region.

Since such a cleaning robot travels in a predetermined region by itself and carries out the task thereof, the cleaning robot is configured to realize autonomous movement, to map a movement space in which the cleaning robot will travel, and to travel in the movement space based on the mapped information in order to perform cleaning.

Specifically, the cleaning robot performs cleaning while repeatedly moving along a path that is set and stored by a user who uses the cleaning robot or a predetermined path that has been stored in the cleaning robot in advance.

However, the conventional cleaning robot performs cleaning irrespective of the degree of necessity of cleaning of the movement space or the degree of completion of cleaning of the movement space. Further, after completing travel along a predetermined path, the conventional cleaning robot terminates cleaning. Thus, the region that needs to be cleaned the most may not be cleaned preferentially. As such, the cleaning efficiency of the conventional cleaning robot is low.

Meanwhile, in recent years, user terminals or image-information-collecting devices (e.g. robots) collecting still images or videos of a specific object have come to be increasingly used. Therefore, demand has arisen for a cleaning robot capable of determining a region to be cleaned based on usage information transmitted from a user terminal or from an image-information-collecting device and performing cleaning while autonomously moving in the determined region to be cleaned.

In addition, there has been demand for a cleaning robot having improved cleaning efficiency, which is capable of preferentially cleaning the region that needs to be cleaned the most and subsequently cleaning another region that needs to be cleaned next.

As a concrete example of cleaning robots having improved cleaning efficiency, a cleaning robot capable of receiving a cleaning operation command through remote control and autonomously moving in response to the cleaning operation command is disclosed in Korean Patent Registration No. 10-0962593, entitled "REGION-BASED CLEANER CONTROL METHOD AND DEVICE AND RECORDING MEDIUM THEREOF".

However, the above patent document ("REGION-BASED CLEANER CONTROL METHOD AND DEVICE AND RECORDING MEDIUM THEREOF") does not concretely disclose technology for autonomously cleaning a region to be cleaned based on the information collected by a user terminal or an image-information-collecting device collecting still images or videos of a specific object.

In addition, Korean Patent Laid-open Publication No. 10-2018-0039437, entitled "CLEANING ROBOT FOR AIRPORT AND OPERATING METHOD THEREOF", discloses technology of receiving data from various devices installed in an airport and efficiently performing cleaning using the received data.

According to this patent document ("CLEANING ROBOT FOR AIRPORT AND OPERATING METHOD THEREOF"), the operation of a cleaning robot is controlled so as to receive data from closed-circuit televisions (CCTVs) or servers installed in an airport or from a user terminal and to clean a region that has not been cleaned.

That is, this patent document ("CLEANING ROBOT FOR AIRPORT AND OPERATING METHOD THEREOF") proposes technology of driving a cleaning robot to clean a region that has not been cleaned based on signals received from various devices installed in an airport. However, this patent document does not concretely disclose technology for improving cleaning efficiency by controlling a cleaning robot such that it preferentially cleans the region that needs to be cleaned the most and subsequently cleans another region that needs to be cleaned next.

Therefore, there is need for a method of driving a cleaning robot to start cleaning from a region that has not been cleaned in order to improve cleaning efficiency.

RELATED ART DOCUMENT

Patent Document

Korean Patent Registration No. 10-0962593 (Jun. 3, 2010)

Korean Patent Laid-open Publication No. 10-2018-0039437 (Apr. 18, 2018)

SUMMARY OF THE INVENTION

An aspect of the present disclosure is to provide a cleaning robot capable of preferentially cleaning a region that needs to be cleaned the most using human activity data.

Another aspect of the present disclosure is to provide a cleaning robot capable of recognizing the activity data of a person who uses various devices based on information about the use of the devices and capable of preferentially cleaning the region in which the human activity level is the lowest. That is, it may be determined that the amount of use of a user terminal or an image-information-collection device collecting still images or videos is small in a region in which people rarely travel and that a large amount of dust or foreign substances is liable to accumulate in the region in which the amount of use of the user terminal or the image-information-collection device is small. Based on this determination, the cleaning robot may preferentially clean the region in which the amount of use of the user terminal or the image-information-collection device is the smallest so as to remove dust or foreign substances collected therein.

Still another aspect of the present disclosure is to provide a cleaning robot capable of autonomously setting a cleaning region based on information about the use of a user terminal or an image-information-collecting device (e.g. a robot) collecting still images or videos and capable of autonomously cleaning a region that needs to be cleaned.

In accordance with an aspect of the present invention, the above and other objects can be accomplished by the provision of a method of driving a cleaning robot, the method including collecting region-based human activity data in a movement space in which the cleaning robot travels through a user terminal or an image-information-collection device monitoring the movement space, setting a preferential traveling region of the cleaning robot performing cleaning in the movement space based on the region-based human activity data, and determining a moving path of the cleaning robot based on the set preferential traveling region.

The setting the preferential traveling region may include determining a region in the movement space in which the human activity data is equal to or less than a threshold value, and determining a moving path of the cleaning robot so that the cleaning robot preferentially cleans the region in the movement space in which the human activity data is equal to or less than the threshold value.

For example, the time for which the user terminal or the image-information-collecting device is used in the movement space or the number of times of use of the same may be compared with a predetermined value, namely the threshold value.

That is, when the time for which the user terminal or the image-information-collecting device is used in the movement space or the number of times of use of the same is less than the threshold value, it may be determined that a region in which the user terminal or the image-information-collecting device is rarely used needs to be cleaned preferentially.

In addition, the determining the region in which the human activity data is equal to or less than the threshold value may include determining a region in the movement space in which the amount of time that the user terminal stays is shorter than a predetermined time, or determining a region in the movement space in which the amount of time that a person stays is shorter than a predetermined time through the image-information-collecting device.

The user terminal may be at least one of a wearable device configured to be worn on a user or a mobile phone, and the image-information-collecting device may be at least one of an artificial-intelligence speaker equipped with a camera, a cleaning robot equipped with a camera, or a closed-circuit television (CCTV).

The setting the preferential traveling region may include analyzing region-based human activity levels in the movement space based on the region-based human activity data and determining priorities of the regions in accordance with the magnitudes of the human activity levels. The determining the moving path of the cleaning robot may include determining a moving path of the cleaning robot based on the priorities of the regions determined in accordance with the magnitudes of the human activity levels.

The determining the moving path of the cleaning robot based on the priorities of the regions determined in accordance with the magnitudes of the human activity levels may include determining a moving path of the cleaning robot from a region in which the magnitude of the human activity level is the smallest to a region in which the magnitude of the human activity level is the largest.

As described above, the cleaning robot may be set to preferentially clean a region in which the user terminal or the image-information-collecting device is rarely used. Based on this, the region in which the user terminal or the image-information-collecting device is rarely used may be determined to be a region in which the magnitude of the human activity level is small, and the region in which the magnitude of the human activity level is the smallest may be cleaned preferentially by the cleaning robot.

The method may further include, before the collecting the human activity data through at least one of the user terminal or the image-information-collecting device, acquiring a map of the movement space in which the cleaning robot travels through preliminary travel of the cleaning robot, and the setting the preferential traveling region may include mapping the region-based human activity data on the map.

In accordance with another aspect of the present invention, there is provided a cleaning robot configured to travel using region-based human activity data, the cleaning robot including a receiving unit configured to communicate with at least one of a user terminal or an image-information-collecting device monitoring a movement space in which the cleaning robot travels, the receiving unit receiving region-based human activity data generated in the movement space, a preferential-traveling-region-setting unit configured to set a preferential traveling region of the cleaning robot performing cleaning in the movement space based on the region-based human activity data, and a moving-path-setting unit configured to determine a moving path of the cleaning robot in accordance with the set preferential traveling region.

The preferential-traveling-region-setting unit may include a threshold value determination unit configured to determine a region in the movement space in which the human activity data is equal to or less than a threshold value, and the moving-path-setting unit may determine a moving path of the cleaning robot so that the cleaning robot preferentially moves to the region in the movement space determined by the threshold value determination unit in which the human activity data is equal to or less than the threshold value in order to the clean the same.

For example, the time for which the user terminal or the image-information-collecting device is used in the movement space or the number of times of use of the same may be compared with a predetermined value, namely the threshold value.

That is, when the time for which the user terminal or the image-information-collecting device is used in the movement space or the number of times of use of the same is equal to or less than the threshold value, it may be determined that a region in which the user terminal or the image-information-collecting device is rarely used needs to be cleaned preferentially.

The threshold value determination unit may determine any one of a region in the movement space in which the amount of time that the user terminal stays is shorter than a predetermined time or a region in the movement space in which the amount of time that a person stays is shorter than a predetermined time through the image-information-collecting device.

The user terminal may be at least one of a wearable device configured to be worn on a user or a mobile phone, and the image-information-collecting device may be at least one of an artificial-intelligence speaker equipped with a camera, a cleaning robot equipped with a camera, or a closed-circuit television (CCTV).

The preferential-traveling-region-setting unit may include a region priority determination unit configured to analyze region-based human activity levels in the movement space based on the region-based human activity data and to determine priorities of the regions in accordance with the magnitudes of the human activity levels, and the moving-path-setting unit may determine a moving path of the cleaning robot based on the priorities of the regions determined by the region priority determination unit.

The moving-path-setting unit may determine a moving path of the cleaning robot from a region in which the magnitude of the human activity level is the smallest to a region in which the magnitude of the human activity level is the largest.

Specifically, the cleaning robot may be set to preferentially clean a region in which the user terminal or the image-information-collecting device is rarely used. Based on this, the region in which the user terminal or the image-information-collecting device is rarely used may be determined to be a region in which the magnitude of the human activity level is small, and the region in which the magnitude of the human activity level is the smallest may be cleaned preferentially by the cleaning robot.

The cleaning robot may further include a map acquisition unit configured to acquire a map of the movement space in which the cleaning robot travels through preliminary travel of the cleaning robot, and the preferential-traveling-region-setting unit may further include a mapping unit configured to map the region-based human activity data on the map acquired by the map acquisition unit.

In accordance with still another aspect of the present invention, there is provided a cleaning robot configured to travel using region-based human activity data, the cleaning robot including a main body, a driving unit configured to move the main body, a memory provided in the main body, the memory being configured to store region-based human activity data generated in a movement space in which the cleaning robot travels and collected by a user terminal or an image-information-collecting device monitoring the movement space, and a control unit configured to control the cleaning robot through communication with the memory and the driving unit.

The control unit may set a preferential traveling region of the cleaning robot performing cleaning in the movement space based on the region-based human activity data, and may determine a moving path of the cleaning robot based on the set preferential traveling region.

As described above, according to the embodiments, the cleaning robot is capable of recognizing the activity data of a person who uses various devices based on information about the use of the devices, and is capable of preferentially cleaning the region in which the human activity level is the lowest.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
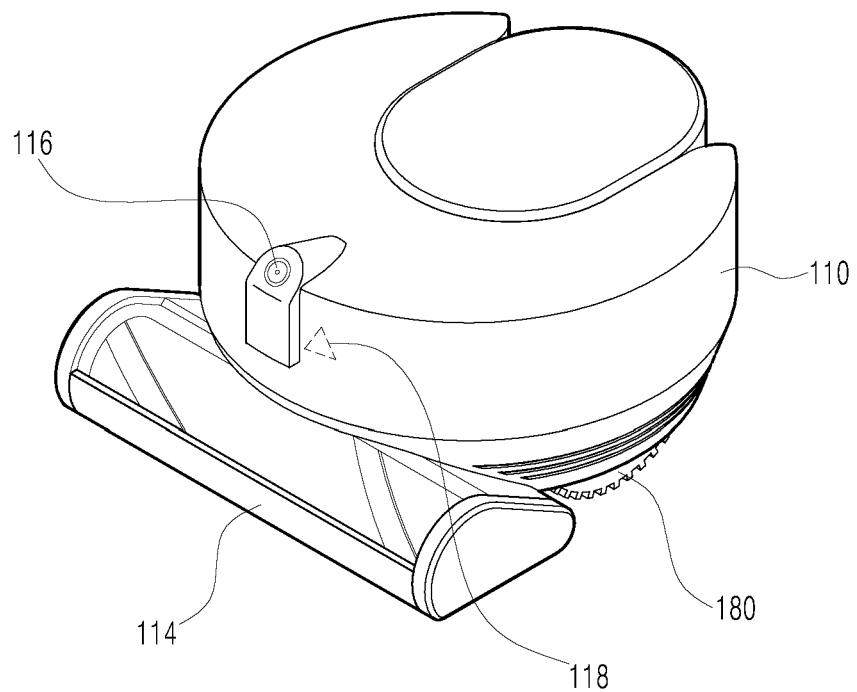
FIG. 1 is a view illustrating a cleaning robot according to an embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. Further, the exemplary embodiments will describe only elements directly related to the idea of the invention, and description of the other elements will be omitted. However, it will be appreciated that the elements, the description of which is omitted, are not unnecessary to realize the apparatus or system according to the exemplary embodiments. Like reference numerals designate like elements throughout the specification.

It will be understood that, although the terms first, second, etc. may be used herein to describe various elements, these elements should not be limited by these terms. These terms are only used to distinguish one element from another. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

Hereinafter, a cleaning robot enabling autonomous travel and capable of recommending the location of a charging station according to an embodiment of the present disclosure will be described in detail with reference to the accompanying drawings.

Figure 2:
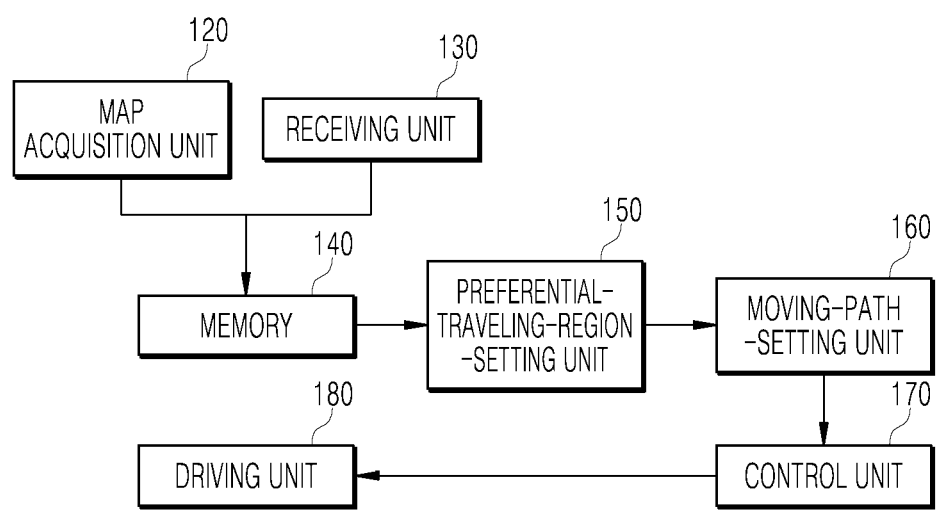
FIG. 2 is a block diagram of the cleaning robot according to the embodiment of the present disclosure.
Figure 3:
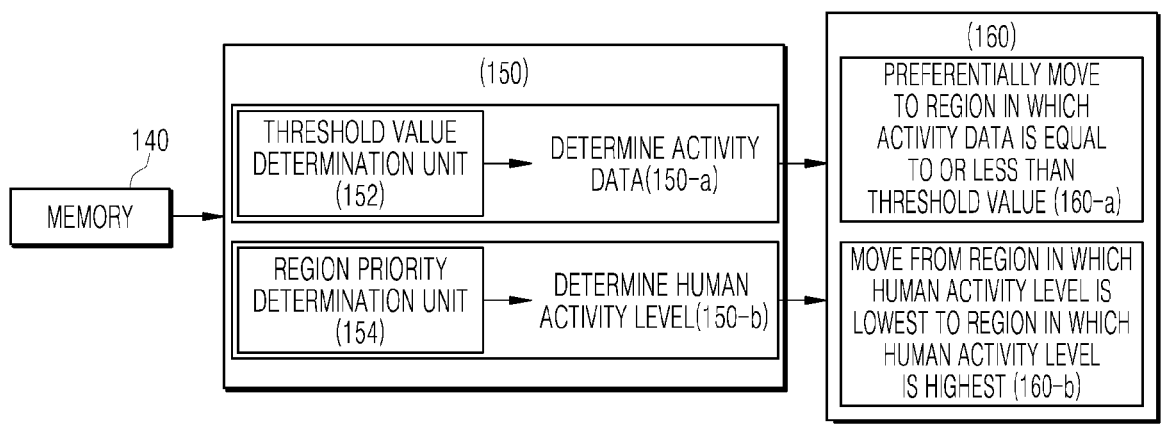
FIG. 3 is a block diagram related to the relationship between a preferential-traveling-region-setting unit and a moving-path-setting unit shown in FIG. 2.

FIG. 1 is a view illustrating a cleaning robot according to an embodiment of the present disclosure, FIG. 2 is a block diagram of the cleaning robot according to the embodiment of the present disclosure, and FIG. 3 is a block diagram related to the relationship between a preferential-traveling-region-setting unit and a moving-path-setting unit shown in FIG. 2.

The cleaning robot according to the embodiment of the present disclosure described herein is, for example, a cleaning robot enabling autonomous travel. However, the cleaning robot may also be driven in a semi-autonomous or manual mode. In addition, the mobile robot enabling machine learning and autonomous travel according to the embodiment of the present disclosure may be any one of robots capable of being driven in an autonomous or semi-autonomous mode, rather than being a cleaning robot.

The cleaning robot 100 according to the embodiment of the present disclosure may suction objects (e.g. dust, garbage, etc.) around the cleaning robot 100 while moving along the moving path. The cleaning robot 100 suctions objects while moving along a set moving path. That is, the cleaning robot suctions foreign substances around the cleaning robot while moving without taking into consideration a preferential traveling region that needs to be cleaned.

Specifically, when the cleaning robot 100 is initially placed at a specific location, the moving path of the cleaning robot 100 may be set based on data mapped by the cleaning robot 100. In general, the moving path is set irrespective of the conditions of an object to be suctioned, the structure of a movement space, etc. Dust or foreign substances easily accumulate in a region in which people rarely travel, and this region needs to be cleaned the most. However, because the cleaning robot 100 moves along the set moving path, the region that needs to be cleaned the most is not cleaned preferentially.

In order to solve the above problem, the embodiment of the present disclosure recognizes a region in which people rarely travel through the details of use of various devices used in the movement space. Thereafter, the embodiment of the present disclosure determines the region in which people rarely travel or the region in which the use time of the devices is short as the region that needs to be cleaned the most, so that this region is cleaned preferentially. As such, since the region in which dust or foreign substances are liable to accumulate is cleaned preferentially, it is possible to improve the cleaning efficiency of the cleaning robot 100.

In order to set a region that needs to be cleaned preferentially, the cleaning robot 100 includes a main body 110 defining the external appearance of the cleaning robot 100, a driving unit 180 moving the main body 110, a memory 140 provided in the main body, in which data on region-based human activity in the movement space, which is collected by a user terminal or an image-information-collecting device monitoring the movement space in which the cleaning robot 100 travels, is stored, and a control unit 170 communicating with the memory 140 and the driving unit 180 to control the cleaning robot 100.

The main body 110 may be formed in any one of various shapes, such as a circular shape and a polygonal shape, and the shape of the main body 110 may be changed depending on the conditions thereof.

The main body 110 may be provided with a suction unit 114, which suctions dust, foreign substances, and the like. To this end, the main body 110 may include a suction device (not shown) and a dust collecting container collecting suctioned dust.

In addition, the main body 110 includes a battery (not shown). The battery is configured to supply the power required for the overall operation of the cleaning robot 100 as well as the driving unit 180 to be described later. When the state of charge of the battery is measured to be equal to or less than a reference value, the cleaning robot 100 may move to a charging station to charge the battery before the battery is discharged.

To this end, the cleaning robot 100 may be configured to include an algorithm that allows the cleaning robot 100 to return to the charging station at an appropriate time point and to detect the position of the charging station by itself while returning to the charging station.

The main body 110 includes a driving unit 180 moving the main body 110. The driving unit 180 may include at least one driving wheel capable of rotating and moving the main body 110. The driving wheel may be provided on one surface of the main body 110. The mounting structure of the driving wheel may be changed depending on the conditions thereof. In addition, the main body 110 or the driving unit 180 may include a separate driving motor for driving the driving wheel.

The human activity data, which is collected by the user terminal or the image-information-collecting device and is stored in the memory 140, may be information based on which the cleaning robot 100 travels and preferentially cleans the region that needs to be cleaned the most.

As described above, the cleaning robot 100 of the present disclosure preferentially cleans the region that needs to be cleaned the most. To this end, it is necessary to set the region that needs to be cleaned the most. At this time, the human activity data collected by the user terminal or the image-information-collecting device may be used. Specifically, a specific region in which the use time of the user terminal or the image-information-collecting device is shorter than a predetermined value or a specific region in which the amount of time that people stay is shorter than a predetermined value may be determined to be a region in which there is little human activity. It may be determined that dust or foreign substances are liable to accumulate in a region in which there is little human activity. Thus, the collected human activity data may be used as information based on which a region in which dust or foreign substances are liable to accumulate is determined.

In addition, information collected by the user terminal or the image-information-collecting device collecting information on the movement space in which the cleaning robot 100 travels may be stored in the memory 140.

To this end, the main body 110 may include an object recognition unit 116, which is capable of measuring the positions of various items disposed in the movement space and the shape of the movement space in order to generate map data of the movement space.

The object recognition unit 116 may be installed at the front side of the main body 110 of the cleaning robot 100 to sense objects present in front of the main body 110. The main body 110 may further include a sensor 118 capable of sensing the distance between the main body 110 and an object present in the movement space or the risk of a collision between the main body 110 and an object.

As described above, the cleaning robot 100 according to the embodiment of the present disclosure preferentially cleans the region that needs to be cleaned the most. To this end, the region that needs to be cleaned the most is determined using human activity data generated in each region in the movement space in which the cleaning robot 100 travels.

Specifically, in order to use the region-based human activity data, the cleaning robot 100 may include a receiving unit 130, which communicates with at least one of the user terminal or the image-information-collecting device monitoring the movement space in which the cleaning robot 100 travels and which receives the region-based human activity data generated in the movement space, a preferential-traveling-region-setting unit 150, which determines a preferential traveling region of the cleaning robot, which performs cleaning in the movement space, based on the region-based human activity data, and a moving-path-setting unit 160, which sets a moving path of the cleaning robot 100 in accordance with the set preferential traveling region.

The user terminal or the image-information-collecting device, which generates the human activity data, may be any one of a personal terminal (refer to S in FIG. 4A), which is capable of being carried by the user, a wearable device (refer to W in FIG. 4A), which is capable of being worn on a part of the user's body, a closed-circuit television (CCTV), which collects information about the user's behavior as a still image or a video in the movement space of the cleaning robot 100, a mobile robot (refer to R in FIG. 4A), an artificial-intelligence speaker equipped with a camera, and a cleaning robot equipped with a camera.

The human activity data generated when using the user terminal or the image-information-collecting device may be information about the use of the user terminal or the image-information-collecting device in the movement space. Specifically, the information about the use of the user terminal or the image-information-collecting device may be communication information generated when the user terminal or the image-information-collecting device is used in the movement space, and may be, for example, any one of data usage information and GPS movement information.

The receiving unit 130 may collect information about the use of the user terminal or human activity data generated by the image-information-collecting device in the movement space. That is, the receiving unit 130 may store information about the time for which the user uses the user terminal and the human activity level collected by the image-information-collecting device.

Based on such information, the control unit 170 may drive the driving unit 180 so that the cleaning robot 100 moves to a space in which the cleaning robot 100 needs to perform cleaning. Specifically, the control unit 170 may perform control such that the cleaning robot 100 moves to a preferential traveling region.

Here, the preferential traveling region is a region to which the cleaning robot 100 needs to move in order to perform cleaning preferentially. As described above, a specific region in the movement space in which the use time of the user terminal or the image-information-collecting device is shorter than a predetermined value or a specific region in the movement space in which the amount of time that people stay is shorter than a predetermined value may be determined to be a region in which there is little human activity.

The preferential traveling region may be set based on whether the data on human activity in the movement space is equal to or less than a threshold value.

Here, the human activity data generated when a person (e.g. a user) uses the user terminal in a specific region in the movement space, e.g. the amount of time that the person stays in the corresponding region or the use time of the user terminal in the corresponding region, is quantified, and the quantified activity level is compared with a predetermined value, namely the threshold value. Specifically, when the use time of the user terminal in the corresponding region or the amount of time that the person stays in the corresponding region is less than the threshold value, this means that the user terminal is rarely used or that there is little information about the user's behavior collected by the image-information-collecting device.

More specifically, people may rarely travel in a region in which a column of a building or furniture is disposed, and thus the use time of the user terminal in this region may be short, or the amount of information collected by the image-information-collecting device may be small. That is, the time for which people stay in the region in which a column of a building or furniture is disposed may be short, and thus dust or foreign substances are liable to accumulate in the region in which a column of a building or furniture is disposed. Thus, the region in which a column of a building or furniture is disposed is set as a region in which the human activity data is less than the threshold value.

The preferential-traveling-region-setting unit 150 may include a threshold value determination unit 152, which determines whether the data on human activity in a specific region is equal to or less than the threshold value. Further, the region in which the human activity data is determined to be equal to or less than the threshold value by the threshold value determination unit 152 may be determined to be a region in which the activity level of a person (e.g. a user) is low (150-*a*). Thus, it may be determined that a large amount of dust or foreign substances accumulates in the above region, and the moving-path-setting unit 160 may set a moving path of the cleaning robot 100 so that the cleaning robot 100 cleans the above region preferentially (160-*a*).

Here, the cleaning operation of the cleaning robot 100 in a region in which human activity data is equal to or less than the threshold value means the cleaning operation of the cleaning robot 100 in a region in which a human activity level is low and thus dust or foreign substances are liable to accumulate.

When the threshold value determination unit 152 determines that the data on human activity in a specific region is equal to or less than the threshold value, the cleaning robot 100 may travel along the moving path set by the moving-path-setting unit 160 in order to clean the corresponding region.

Similarly, the preferential-traveling-region-setting unit 150 may analyze the human activity levels in respective regions in the movement space, in which the cleaning robot 100 moves, based on the data on human activity in the respective regions in the movement space, and may determine the priorities of the regions in accordance with the magnitudes of the human activity levels.

For example, a region partitioning the movement space, or a region in which a column or furniture is disposed or in which items are stacked, may be the region in which the human activity level is the lowest, and a region close to the center of the movement space in which there are no obstacles may be the region in which the human activity level is the highest (150-*a*).

The priorities of regions may be determined by a region priority determination unit 154. The priorities of regions determined by the region priority determination unit 154 may be data used to set the moving path of the cleaning robot 100.

As described above, the region in which the human activity level is the highest may have the lowest priority, and the region in which the human activity level is the lowest may be a region in which dust or foreign substances are liable to accumulate. As a result, the moving-path-setting unit 160 may set the moving path such that the cleaning robot 100 travels from the region in which the human activity level is the lowest to the region in which the human activity level is the highest (160-*a*).

In addition, the cleaning robot 100 further includes a map acquisition unit 120, which acquires a map of the movement space through preliminary travel of the cleaning robot 100. The human activity data may be mapped on the map of the movement space acquired by the map acquisition unit 120 so as to set a region in which the cleaning robot 100 needs to travel preferentially.

Meanwhile, the receiving unit 130 may continuously receive new information. For example, the usage position of the user terminal and the human activity level collected by the image-information-collecting device may be changed over a predetermined period of time. The receiving unit 130 may continuously collect this variation, may recognize information about the behavior of a person who travels in the movement space based on the collected information, and may continuously generate data of the region that needs to be cleaned the most. Accordingly, the region that needs to be cleaned the most is cleaned preferentially, thereby minimizing the accumulation of dust or foreign substances in the movement space.

In the process of driving the cleaning robot 100 configured as described above, the map of the movement space, in which the cleaning robot 100 travels, may be acquired by the map acquisition unit 120, and the information about the human activity data, acquired by the receiving unit 130 through the user terminal or the image-information-collecting device, may be stored in the memory 140.

When it is determined that the data on human activity in a specific region stored in the memory 140 is equal to or less than the threshold value, the corresponding region may be set as a preferential traveling region.

The preferential traveling region is a region to which the cleaning robot 100 needs to move preferentially in order to perform cleaning. A specific region in the movement space in which the use time of the user terminal or the image-information-collecting device is shorter than a predetermined value or a specific region in the movement space in which the amount of time that people stay is shorter than a predetermined value may be determined to be a region in which there is little human activity.

When a person (e.g. a user) uses the user terminal in a specific region in the movement space, the human activity occurring in the corresponding region, e.g. the amount of time that the person stays in the corresponding region or the use time of the user terminal in the corresponding region, is quantified. When the quantified activity level in a specific region is equal to or less than a predetermined level, the corresponding region may be set as a preferential traveling region.

At this time, the preferential traveling region may be set based on whether the data on human activity in the movement space is equal to or less than a threshold value. Here, the human activity data generated when a person (e.g. a user) uses the user terminal in a specific region in the movement space, e.g. the amount of time that the person stays in the corresponding region or the use time of the user terminal in the corresponding region, is quantified, and the quantified activity level is compared with a predetermined value, namely the threshold value. Specifically, according to the embodiment of the present disclosure, when the use time of the user terminal in the corresponding region or the amount of time that the person stays in the corresponding region is less than the threshold value, this means that the user terminal is rarely used, or that there is little information about the user's behavior collected by the image-information-collecting device.

As such, when the preferential traveling region, i.e. the region in which the human activity data is equal to or less than the threshold value, is set, the moving-path-setting unit 160 may set a moving path of the cleaning robot 100 so that the cleaning robot 100 preferentially cleans the preferential traveling region, in which the human activity data is equal to or less than the set threshold value. Here, the cleaning operation of the cleaning robot 100 in a region in which human activity data is equal to or less than the threshold value means the cleaning operation of the cleaning robot 100 in a region in which a human activity level is low and thus dust or foreign substances are liable to accumulate.

That is, the region set as a preferential traveling region is a region in which a large amount of dust or foreign substances may accumulate and the region that needs to be cleaned the most.

Further, the human activity levels in respective regions in the movement space may be different from each other. Thus, it is possible to determine the priorities of the regions in accordance with the human activity levels. For example, the region in which the human activity level is the lowest may be determined to be a region in which dust or foreign substances are liable to accumulate. As a result, the moving path of the cleaning robot 100 may be set such that the cleaning robot 100 travels from the region in which the human activity level is the lowest to the region in which the human activity level is the highest.

Therefore, the cleaning robot 100 according to the embodiment of the present disclosure stores an algorithm that allows the cleaning robot 100 to preferentially clean the region in which the human activity level is the lowest.

With the configuration of the cleaning robot 100 described above, the cleaning robot 100 moves to the region that needs to be cleaned the most, and preferentially cleans the corresponding region. In particular, since dust or foreign substances easily accumulate in a region in which people rarely travel, the cleaning robot 100 preferentially cleans the region in which a large amount of dust or foreign substances accumulates. As a result, it is possible to improve the cleaning efficiency of the cleaning robot 100.

Hereinafter, the process of setting a position to be cleaned preferentially by the cleaning robot 100 will be described in detail with reference to FIGS. 4 to 6.

Figure 4A:
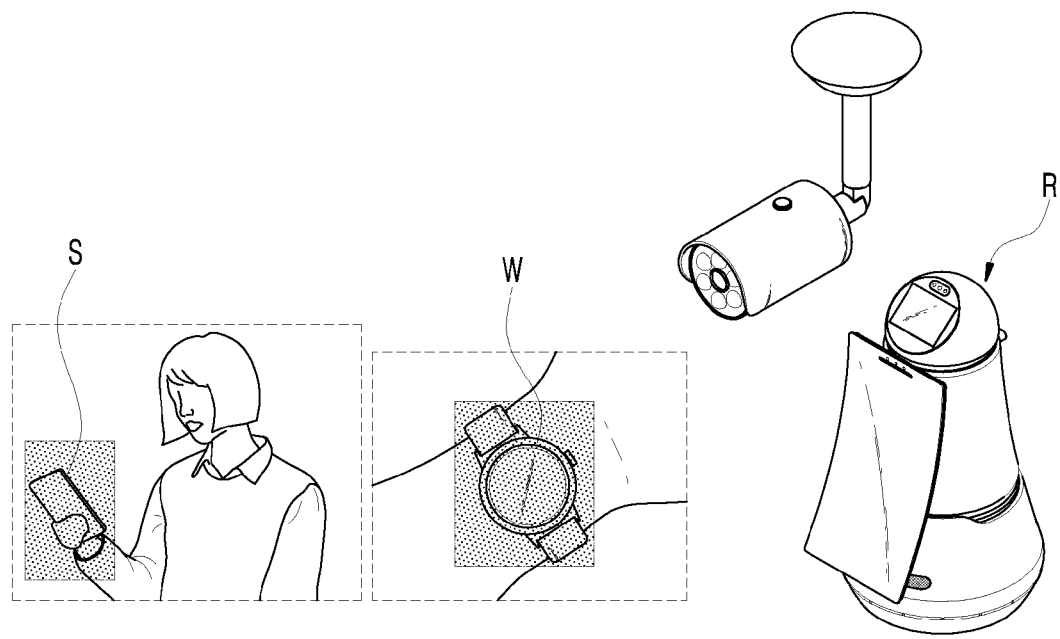
FIG. 4A illustrates devices acquiring human activity data.
Figure 4B:
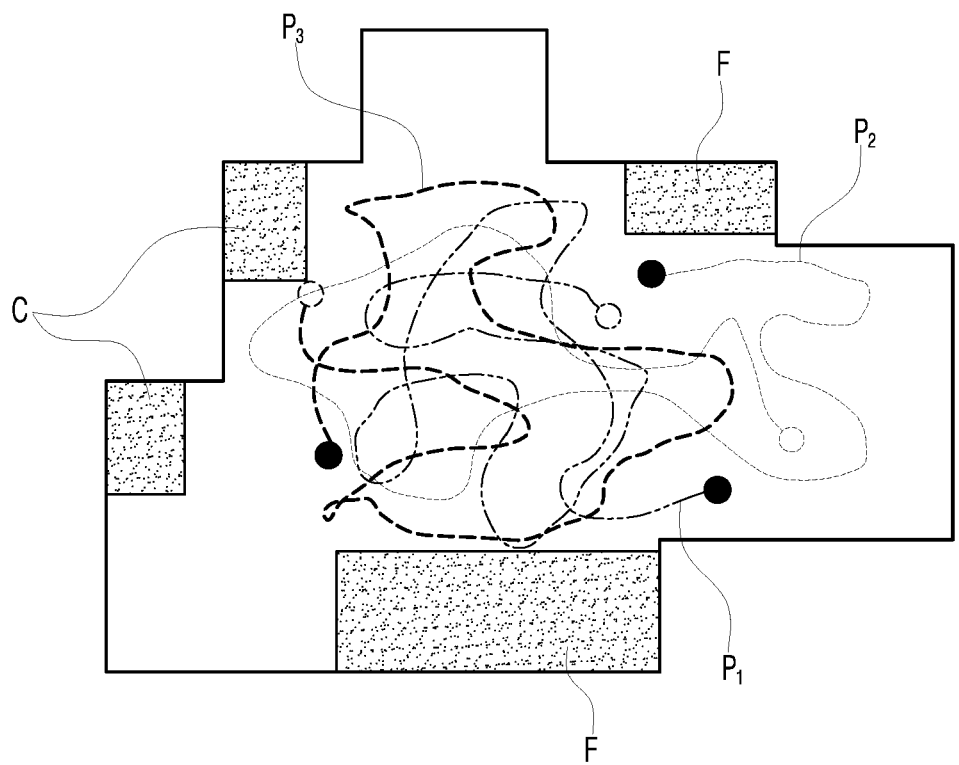
FIG. 4B is a view illustrating a moving path of the cleaning robot based on human activity data.
Figure 5:
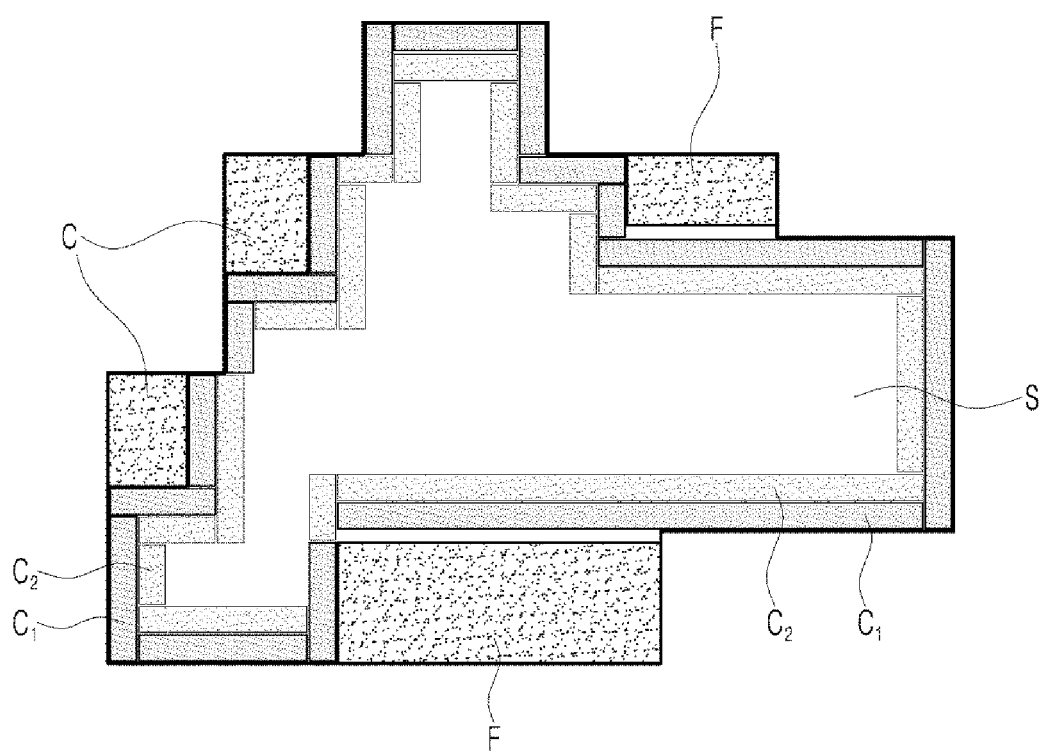
FIG. 5 is a view for explaining an example of a region in which the cleaning robot travels preferentially according to the embodiment of the present disclosure.
Figure 6:
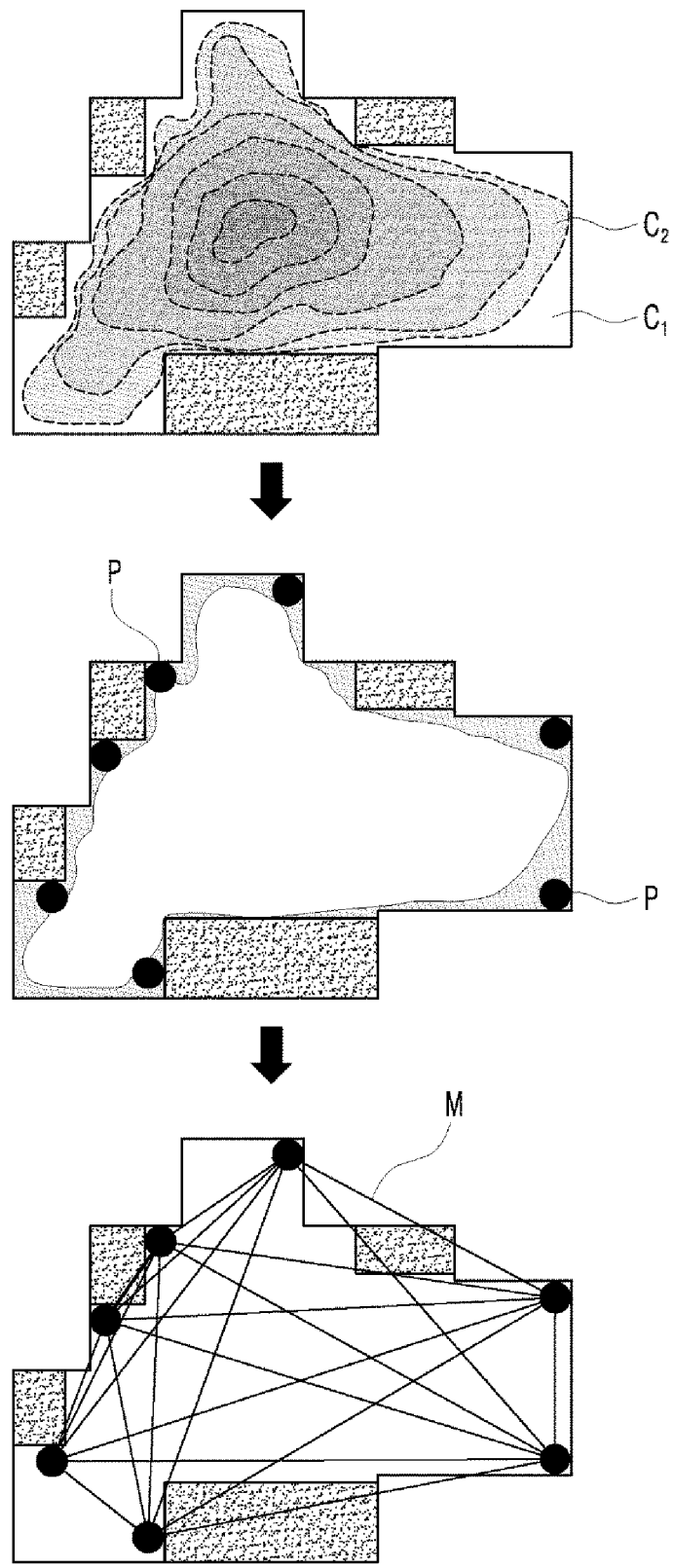
FIG. 6 is a view for explaining an example of setting a moving path of the cleaning robot according to the embodiment of the present disclosure.

FIG. 4A illustrates devices acquiring human activity data, FIG. 4B is a view illustrating a moving path of the cleaning robot based on human activity data, FIG. 5 is a view for explaining an example of a region in which the cleaning robot travels preferentially according to the embodiment of the present disclosure, and FIG. 6 is a view for explaining an example of setting a moving path of the cleaning robot according to the embodiment of the present disclosure.

Referring to FIG. 4A and FIG. 4B, the human activity data of the user may be collected by a portable terminal S, a wearable device W, which is capable of being worn on a part of the user's body, or an image-information-collecting device, such as a cleaning robot R or a CCTV, which is installed in a building and collects video or image information of the user (refer to FIG. 4A).

Specifically, the human activity data may include a use time of the user terminal, position information of the user terminal, and information about the user's behavior (e.g. the appearance of the user, GPS information of the user, etc.) collected by the image-information-collecting device.

The human activity data collected in this manner may include information about a position at which the user terminal or the image-information-collecting device is used. For example, the human activity data may include information about a position at which a user mainly uses the user terminal in a house or information about a position at which a user is mainly located in a building (e.g. an airport, a building, etc.).

The movement of a plurality of users may be tracked using the human activity data (refer to $P_1$, $P_2$ and $P_3$ in FIG. 4B). In general, a user may use the user terminal at a position distant from a column C or furniture F, rather than around the column C or the furniture F in a building. This information may be collected by the user terminal or the image-information-collecting device (refer to FIG. 4B).

That is, the human activity data measured around the column C or the furniture F may be equal to or less than a threshold value, or the human activity level measured around the column C or the furniture F may be less than a predetermined value.

As a result, as shown in FIG. 5, the regions adjacent to the column C and the furniture F may be set as preferential traveling regions $C_1$ and $C_2$, which need to be cleaned the most.

Here, the preferential traveling regions may include a first preferential traveling region $C_1$, which is the closest to the column C and the furniture F, and a second preferential traveling region $C_2$, which is adjacent to the first preferential traveling region $C_1$. However, the present disclosure is not limited as to the specific manner of division of the preferential traveling regions.

As described above, the human activity data may be collected through the information about the use of the user terminal or the image-information-collecting device, and the preferential traveling region may be set. When the preferential traveling region is set, the cleaning robot 100 moves to the preferential traveling region in order to clean the same.

At this time, the cleaning robot 100 may include an algorithm that allows the cleaning robot 100 to move to the first preferential traveling region $C_1$ in order to clean the same and to move to the second preferential traveling region $C_2$ in order to clean the same when the cleaning of the first preferential traveling region $C_1$ is completed.

In this manner, the region that needs to be cleaned the most is cleaned preferentially, and a region in which people frequently travel (e.g. the center of an indoor space in the present disclosure, refer to S in FIG. 5) is cleaned later. As a result, it is possible to improve the cleaning efficiency of the cleaning robot 100.

Meanwhile, in order to set the preferential traveling region, the travel patterns of persons traveling indoors may be expressed using a map. For example, in order to set the preferential traveling region, the travel patterns of the respective persons traveling indoors may be expressed using a map in a manner such that regions in which the persons travel more frequently are more strongly weighted. As a result, a region that is closer to the center of the indoor space may be more strongly weighted when expressed using a map (refer to FIG. 6).

After the travel patterns of the persons are expressed using a map in a manner such that a region in which the persons travel more frequently is more strongly weighted, positions P may be arbitrarily set in a region in which the persons rarely travel (refer to FIG. 6).

The set arbitrary positions P may serve as reference points used to set the moving path M of the cleaning robot 100. For example, it is possible to set the first preferential traveling region $C_1$, which needs to be cleaned preferentially, and subsequently to set the second preferential traveling region $C_2$ by connecting the arbitrary positions P (refer to FIG. 6).

The cleaning robot 100 may perform cleaning while sequentially moving along the moving path M set in the above manner from a region in which there is a relatively large amount of dust or garbage, i.e. the region that needs to be cleaned the most, to a region in which there is a relatively small amount of dust or garbage.

Hereinafter, the process in which the cleaning robot 100 preferentially cleans the region that needs to be cleaned the most will be described with reference to FIGS. 7 to 9.

Figure 7:
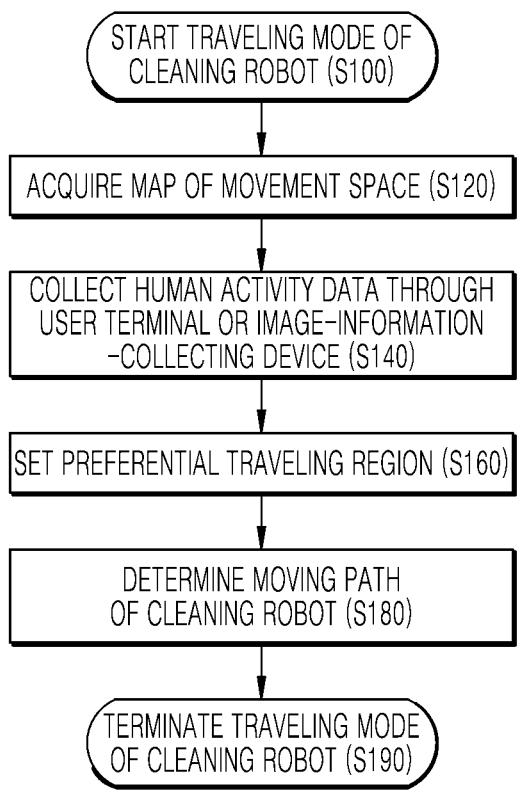
FIG. 7 is a flowchart illustrating a traveling process of the cleaning robot according to the embodiment of the present disclosure.

FIG. 7 is a flowchart illustrating the traveling process of the cleaning robot according to the embodiment of the present disclosure. FIGS. 8 and 9 are flowcharts illustrating the process of setting a preferential traveling region of the cleaning robot shown in FIG. 7.

Figure 8:
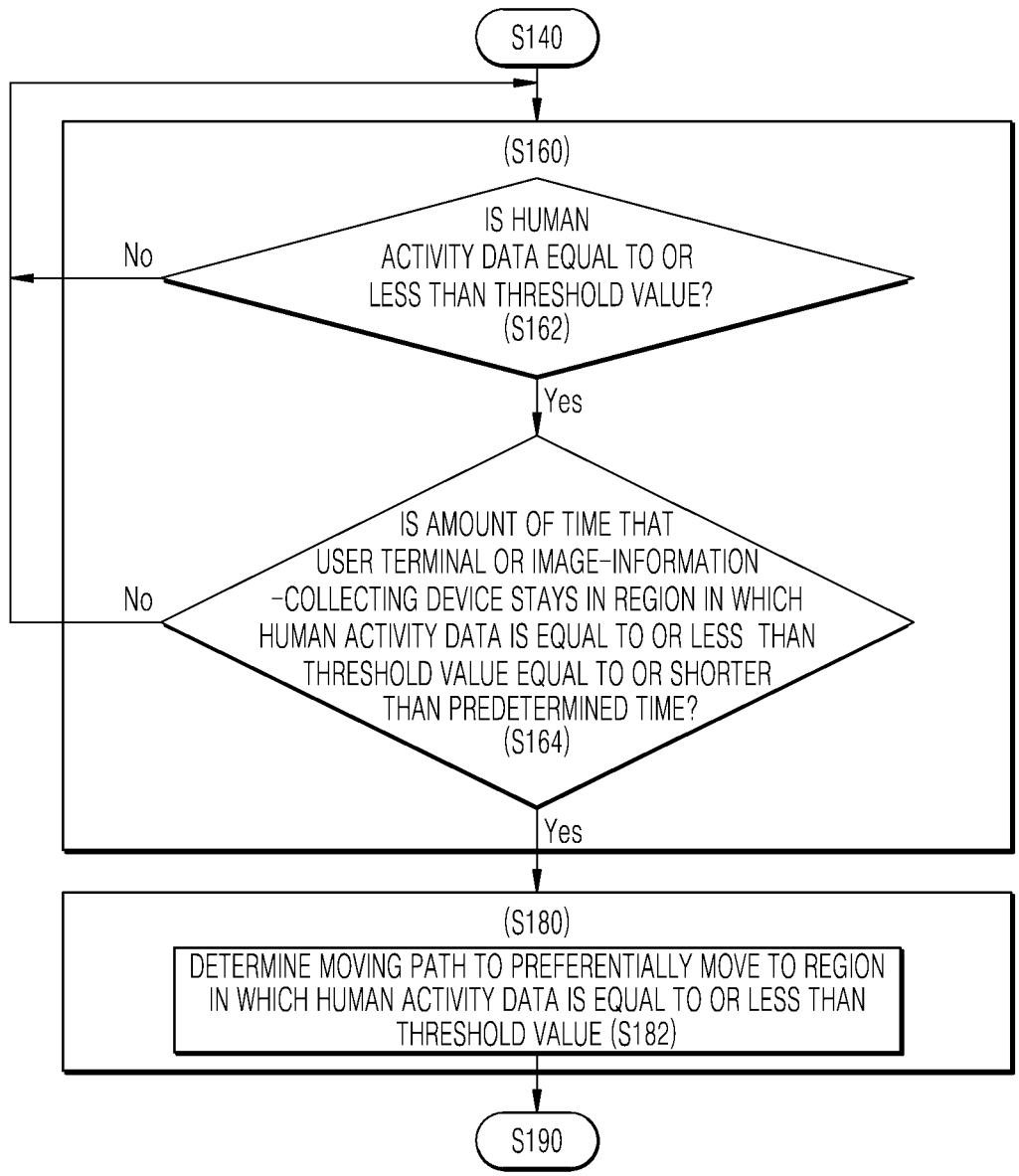
FIGS. 8 and 9 are flowcharts illustrating a process of setting a preferential traveling region of the cleaning robot shown in FIG. 7.
Figure 9:
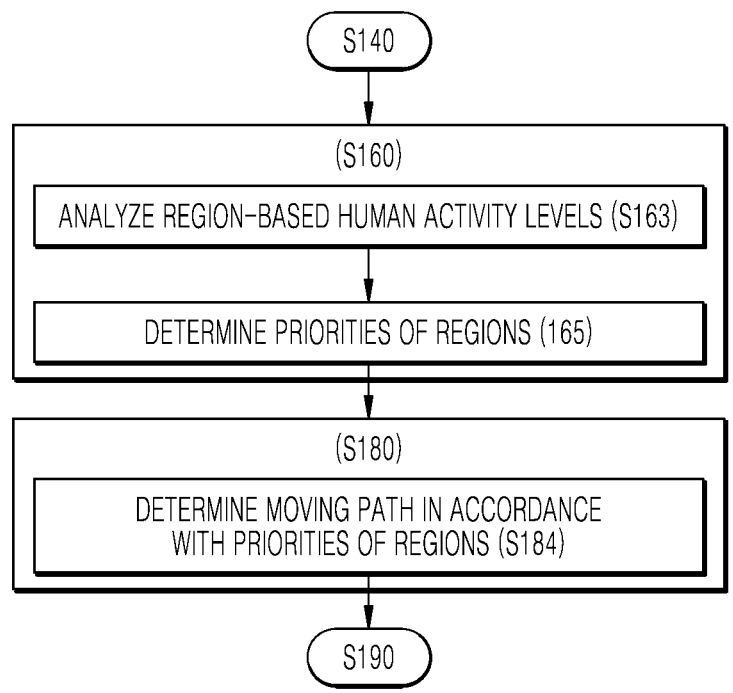

The reference numerals in FIGS. 7 to 9 that are the same as those in FIGS. 1 to 6 represent the same components, and thus a detailed explanation thereof will be omitted.

The cleaning robot 100 according to the embodiment of the present disclosure is an apparatus that automatically suctions objects, such as dust or garbage, present around the cleaning robot 100 while moving along the moving path.

The cleaning robot 100 may include an algorithm that allows the cleaning robot 100 to preferentially clean the region that needs to be cleaned the most. That is, the cleaning robot preferentially cleans a region in which a human activity level is low and thus dust or foreign substances such as garbage are liable to accumulate using human activity data, whereby the cleaning efficiency of the cleaning robot is improved.

In order to set the region that needs to be cleaned the most, it is necessary to set a region in which dust or foreign substances easily accumulate. To this end, human activity data may be collected using information about the use of various devices used in the movement space (S100).

Specifically, referring to FIG. 7, it is possible to acquire a map of the movement space in which the cleaning robot 100 moves through preliminary travel of the cleaning robot 100. Thereafter, the user may acquire the human activity data through the terminal or the image-information-collecting device (S120 and S140).

The human activity data generated when using the user terminal or the image-information-collecting device may be information about the use of the user terminal or the image-information-collecting device in the movement space. Specifically, the information about the use of the user terminal or the image-information-collecting device may be communication information generated when the user terminal or the image-information-collecting device is used in the movement space, and may be, for example, any one of data usage information and GPS movement information.

Here, the user terminal or the image-information-collecting device, which generates the human activity data, may be any one of a personal terminal (refer to S in FIG. 4A), which is capable of being carried by the user, a wearable device (refer to W in FIG. 4A), which is capable of being worn on a part of the user's body, a CCTV, which collects information about the user's behavior as a still image or a video in the movement space of the cleaning robot 100, a mobile robot (refer to R in FIG. 4A), an artificial-intelligence speaker equipped with a camera, and a cleaning robot equipped with a camera.

In this manner, the information about the use of the user terminal or the image-information-collecting device may be acquired, and the movement of the user who uses the user terminal or the image-information-collecting device may be tracked. Specifically, a region in which the user terminal is rarely used or in which the use time thereof is short or a region in which the human activity level collected by the image-information-collecting device is low is set as a preferential traveling region (S160).

Specifically, the preferential traveling region is a region to which the cleaning robot 100 needs to move preferentially in order to perform cleaning. As described above, a specific region in the movement space in which the use time of the user terminal or the image-information-collecting device is shorter than a predetermined value or a specific region in the movement space in which the amount of time that the people stay is shorter than a predetermined value may be determined to be a region in which there is little human activity.

Dust or foreign substances may easily accumulate in the preferential traveling region, in which people rarely travel. Therefore, the cleaning robot 100 is set to preferentially clean the preferential traveling region.

The moving path of the cleaning robot 100 is set using the human activity data collected in the above manner, and the traveling mode of the cleaning robot is terminated (S180 and S190).

Hereinafter, the process of setting the preferential traveling region that needs to be cleaned the most based on the collected human activity data will be described with reference to FIG. 8.

First, in the state in which the human activity data is collected, it may be determined whether the human activity data is equal to or less than a threshold value (S162).

Here, the human activity data generated when a person (e.g. a user) uses the user terminal in a specific region in the movement space, e.g. the amount of time that the person stays in the corresponding region or the use time of the user terminal in the corresponding region, is quantified, and the quantified activity level is compared with a predetermined value, namely the threshold value. Specifically, when the use time of the user terminal in the corresponding region or the amount of time that the person stays in the corresponding region is less than the threshold value, this means that the user terminal is rarely used or that there is little information about the user's behavior collected by the image-information-collecting device.

Specifically, it may be determined whether the time for which the user terminal or the image-information-collecting device stays in a region in which the human activity data is equal to or less than the threshold value is equal to or shorter than a predetermined time (S164).

For example, people may rarely travel in a region in which a column of a building or furniture is disposed, and thus the use time of the user terminal in this region may be short, or the amount of information collected by the image-information-collecting device may be small. That is, the time for which people stay in the region in which a column of a building or furniture is disposed may be short.

When the time for which the user terminal or the image-information-collecting device stays in a region in which the human activity data is equal to or less than the threshold value is equal to or shorter than a predetermined time, the region in which the human activity data is equal to or less than the threshold value may be determined to be a region in which the activity level of a person (e.g. a user) is low and thus a large amount of dust or foreign substances accumulates. Thus, the moving path of the cleaning robot 100 may be set so that the cleaning robot 100 preferentially cleans the region in which the human activity data is equal to or less than the threshold value (S182).

Here, the cleaning operation of the cleaning robot 100 in a region in which human activity data is equal to or less than the threshold value means the cleaning operation of the cleaning robot 100 in a region in which a human activity level is low and thus dust or foreign substances are liable to accumulate.

Similarly, referring to FIG. 9, the preferential traveling region may be set based on the data on human activity in respective regions in the movement space in which the cleaning robot 100 moves.

That is, the human activity levels in the respective regions in the movement space may be analyzed, and the priorities of the regions may be determined in accordance with the magnitudes of the human activity levels (S163 and S165). For example, a region partitioning the movement space, or a region in which a column or furniture is disposed or in which items are stacked, may be the region in which the human activity level is the lowest, and a region close to the center of the movement space in which there are no obstacles may be the region in which the human activity level is the highest.

The priorities of regions determined in the above manner may be data used to set the moving path of the cleaning robot 100 (S184).

In order to facilitate the cleaning of the movement space, the cleaning robot 100 may be set to clean the movement space starting from a region in which a large amount of dust or foreign substances accumulates.

To this end, based on the human activity data, such as use information of the user terminal that is used by the user moving in the movement space or image information of the user moving in the movement space, the cleaning robot 100 moves preferentially to a region in which the user rarely travels in order to clean the same.

In this manner, the region that needs to be cleaned the most is cleaned preferentially. To this end, a region in which the user rarely travels is cleaned preferentially using the use information of the terminal that is used by the user traveling in the movement space and the information from the image-information-collecting device collecting the image information of the user.

In addition, in order to set a region that needs to be cleaned preferentially, a region in which the user moving in the movement space rarely travels may be expressed using a map based on the information about a region in which the user terminal is used and in which the image-information-collecting device collects information. The moving path of the cleaning robot may be set based on the above map so that the cleaning robot moves preferentially to a region in which the user rarely travels. The region in which the user rarely travels may be a region in which a large amount of dust or foreign substances may accumulate. As a result, the cleaning robot preferentially cleans the region that needs to be cleaned the most without using a map representing the interior of the movement space or a prescribed map stored in the cleaning robot, thereby preferentially cleaning a region from which dust or foreign substances need to be removed.

In addition, in a region in which furniture or a column of a building is disposed, the number of times or the probability that the cleaning robot senses objects may be greater than the number of times or the probability that the cleaning robot senses people. Further, when the number of times or the probability that the cleaning robot senses objects is greater in a specific region, a larger amount of dust or foreign substances may accumulate in the corresponding region. The cleaning robot learns this phenomenon, and starts the cleaning operation from a region in which furniture or a column of a building is disposed or in which items are stacked, thereby effectively removing dust or foreign substances collected in the movement space.

In addition, human activity data may be continuously collected through the user terminal and the image-information-collecting device according to prescribed conditions. Thus, it is possible to continuously generate information about the region that needs to be cleaned the most. As a result, the region that needs to be cleaned the most is cleaned preferentially based on the generated information, thereby minimizing the accumulation of dust or foreign substances in the movement space.

Although all of the elements constituting the embodiments of the present disclosure are described as being integrated into a single element or to be operated as a single element, the present disclosure is not necessarily limited to such embodiments. In some embodiments, all of the elements may be selectively integrated into more than one element and be operated as more than one element without departing from the object or scope of the present disclosure. Each of the elements may be implemented as an independent hardware component. Alternatively, some or all of the elements may be selectively combined into one or more hardware components with a computer program having a program module that causes the hardware components to perform some or all of the functions described herein. Code and code segments constituting the computer program may be easily devised by those skilled in the art to which the present disclosure pertains. The computer program may be stored in computer-readable media such that the computer program is read and executed by a computer to implement the embodiments of the present disclosure. The storage media of the computer program include magnetic recording media, optical recording media, and semiconductor recording devices. Further, the computer program implementing the embodiments of the present disclosure includes a program module transmitted in real time via an external device.

As is apparent from the above description, according to the embodiments of the present disclosure, in order to preferentially remove dust or foreign substances collected in a movement space in which people rarely travel, a cleaning robot is capable of recognizing the activity data of a person who uses various devices based on information about the use of the devices and is capable of preferentially cleaning the region in which the human activity level is the lowest in order to remove dust or foreign substances collected therein, thereby improving the cleaning efficiency of the cleaning robot.

That is, a region in which a small amount of human activity data is generated may be a region that people rarely occupy, or a region in which a user terminal or an image-information-collecting device is rarely used. It may be determined that a larger amount of dust or foreign substances is liable to accumulate in a region in which a small amount of human activity data is generated than in other regions. The cleaning robot moves preferentially to a region in which a small amount of human activity data is generated in order to remove dust or foreign substances therefrom. At this time, it may be determined that a region that people mainly occupy is a region having a low cleaning priority. As a result, a region in which there is a large amount of dust or foreign substances is cleaned preferentially, whereby the cleaning efficiency of the cleaning robot is improved.

In addition, the human activity levels in respective regions in the movement space in which the cleaning robot moves may be analyzed, and the moving path of the cleaning robot may be set such that the cleaning robot travels from the region in which the human activity level is the lowest to the region in which the human activity level is the highest. Specifically, the human activity level may be determined using the activity level of the user generated when the user uses the user terminal or the activity level of the user collected by the image-information-collecting device. The cleaning robot preferentially cleans a region in which the human activity level is the lowest or a region in which the number of times or the probability that the cleaning robot senses objects is greater than the number of times or the probability that the cleaning robot senses people, e.g. a region in which furniture or a column of a building is disposed, thereby preferentially removing foreign substances or dust collected near furniture or a column of a building. As a result, since a region in which people rarely travel is cleaned preferentially by the cleaning robot according to the present disclosure, dust collected in the movement space is effectively removed.

In addition, data on the region that needs to be cleaned the most in the movement space may be continuously generated. As a result, it is possible to minimize the accumulation of dust or foreign substances in the movement space.

The present disclosure described as above is not limited by the aspects described herein and accompanying drawings. It should be apparent to those skilled in the art that various substitutions, changes and modifications which are not exemplified herein but are still within the spirit and scope of the present disclosure may be made. Therefore, the scope of the present disclosure is defined not by the detailed description, but by the claims and their equivalents, and all variations within the scope of the claims and their equivalents are to be construed as being included in the present disclosure.

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of driving a cleaning robot, the method comprising:
    collecting region-based human activity data in a movement space, in which the cleaning robot travels, through at least one of a user terminal or an image-information-collecting device monitoring the movement space;
    setting a preferential traveling region of the cleaning robot performing cleaning in the movement space based on the collected region-based human activity data by analyzing region-based human activity levels in the movement space and determining priorities of regions within the movement space in accordance with human activity magnitude levels; and
    determining a moving path of the cleaning robot in accordance with the set preferential traveling region, wherein the moving path is determined based on the determined priorities of the regions within the moving space such that the moving path begins in a region with a smallest human activity magnitude level and ends in a region with a largest human activity magnitude region.

2. The method of claim 1, wherein the setting the preferential traveling region comprises determining a region in the movement space in which the human activity data is equal to or less than a threshold value, and wherein the determining the moving path of the cleaning robot comprises determining a moving path of the cleaning robot so that the cleaning robot preferentially cleans the determined region in the movement space in which the human activity data is equal to or less than the threshold value.

3. The method of claim 2, wherein the determining the region in which the human activity data is equal to or less than the threshold value comprises at least one of:
determining a region in the movement space in which an amount of time that the user terminal stays is shorter than a predetermined time; or
determining a region in the movement space in which an amount of time that a person stays is shorter than a predetermined time through the image-information-collecting device.

4. The method of claim 1, wherein the user terminal is at least one of a wearable device configured to be worn on a user or a mobile phone, and
wherein the image-information-collecting device is at least one of an artificial-intelligence speaker equipped with a camera, a cleaning robot equipped with a camera, or a closed-circuit television (CCTV).

5. The method of claim 1, further comprising, before the collecting, acquiring a map of the movement space of a preliminary travel of the cleaning robot, wherein the preferential traveling region is set by mapping the region-based human activity data on the map.

6. A cleaning robot configured to travel using region-based human activity data, the cleaning robot comprising:
one or more processor configured to:
communicate with at least one of a user terminal or an image-information-collecting device monitoring a movement space in which the cleaning robot travels, wherein one or more processors are further configured to receive region-based human activity data generated in the movement space;
set a preferential traveling region of the cleaning robot performing cleaning in the movement space based on the region-based human activity data by analyzing region-based human activity levels in the movement space and determining priorities of regions within the movement space in accordance with human activity magnitude levels; and
determine a moving path of the cleaning robot in accordance with the set preferential traveling region, wherein the moving path is determined based on the determined priorities of the regions within the moving space such that the moving path begins in a region with a smallest human activity magnitude level and ends in a region with a largest activity magnitude region.

7. The cleaning robot of claim 6, wherein the one or more processors are further configured to determine a region in the movement space in which the human activity data is equal to or less than a threshold value, and
wherein the one or more processors are further configured to determine a moving path of the cleaning robot such that the cleaning robot preferentially moves to the determined region in the movement space in which the human activity data is equal to or less than the threshold value.

8. The cleaning robot of claim 7, wherein the one or more processors are further configured to determine any one of a region in the movement space in which an amount of time that the user terminal stays is shorter than a predetermined time or a region in the movement space in which an amount of time that a person stays is shorter than a predetermined time through the image-information-collecting device.

9. The cleaning robot of claim 6, wherein the user terminal is at least one of a wearable device configured to be worn on a user or a mobile phone, and
wherein the image-information-collecting device is at least one of an artificial-intelligence speaker equipped with a camera, a cleaning robot equipped with a camera, or a closed-circuit television (CCTV).

10. The cleaning robot of claim 6, wherein the one or more processors are further configured to acquire a map of the movement space in which the cleaning robot travels through during a preliminary travel of the cleaning robot,
wherein the one or more processors are further configured to map the region-based human activity data on the acquired map.

11. A cleaning robot configured to travel using region-based human activity data, the cleaning robot comprising:
a main body;
a driving unit configured to move the cleaning robot;
a memory provided in the main body, the memory being configured to store region-based human activity data generated in a movement space in which the cleaning robot travels and collected by a user terminal or an image-information-collecting device monitoring the movement space; and
a control unit configured to control the cleaning robot through communication with the memory and the driving unit,
wherein the control unit is further configured to:
set a preferential traveling region of the cleaning robot performing cleaning in the movement space based on the region-based human activity data by analyzing region-based human activity levels in the movement space and determining priorities of regions within the movement space in accordance with human activity magnitude levels, and
determine a moving path of the cleaning robot based on the set preferential traveling region, wherein the moving path is determined based on the determined priorities of the regions within the moving space such that the moving path begins in a region with a smallest human activity magnitude level and ends in a region with a largest activity magnitude region.

* * * * *